May 15, 1928.  1,669,882
E. A. SPERRY
SEARCHLIGHT FOR THE GUIDANCE OR DETECTION OF AIRCRAFT
Original Filed April 19, 1918
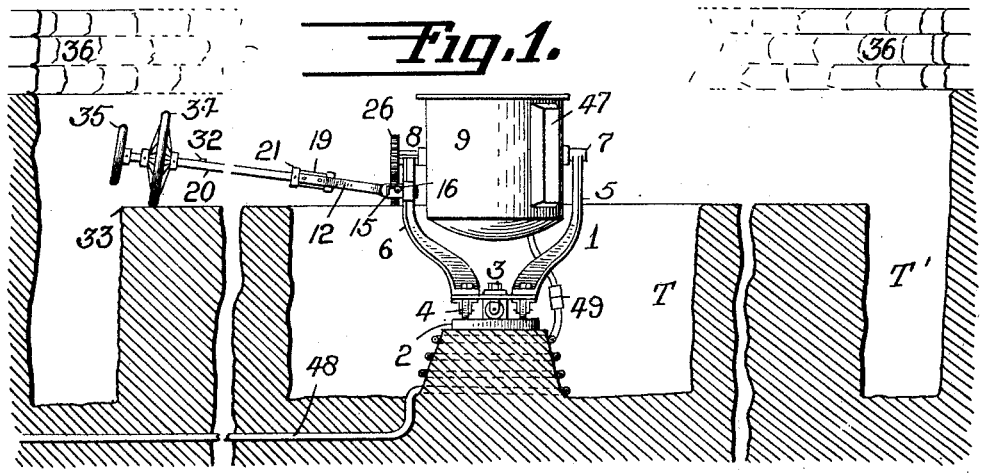
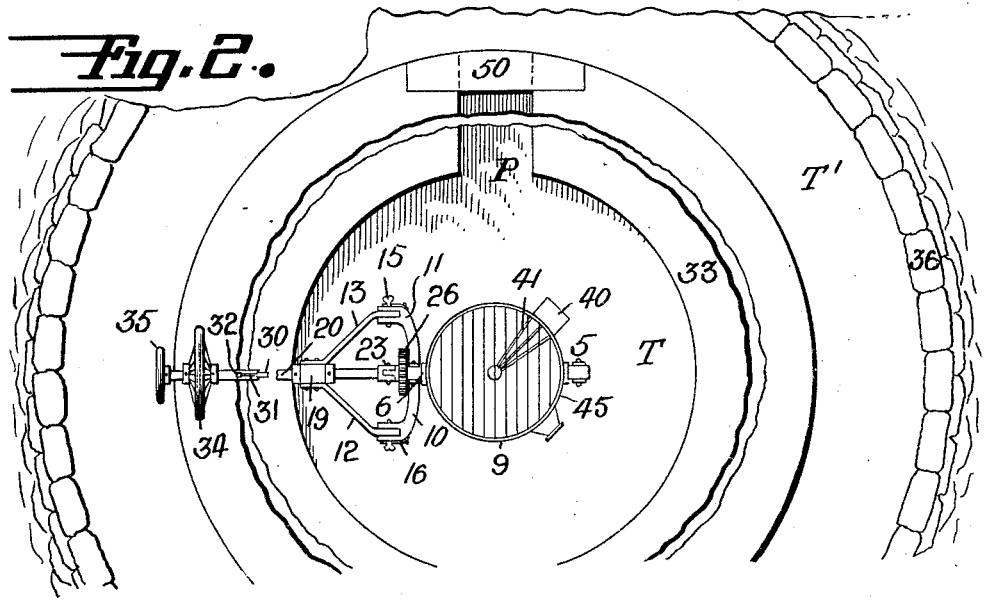
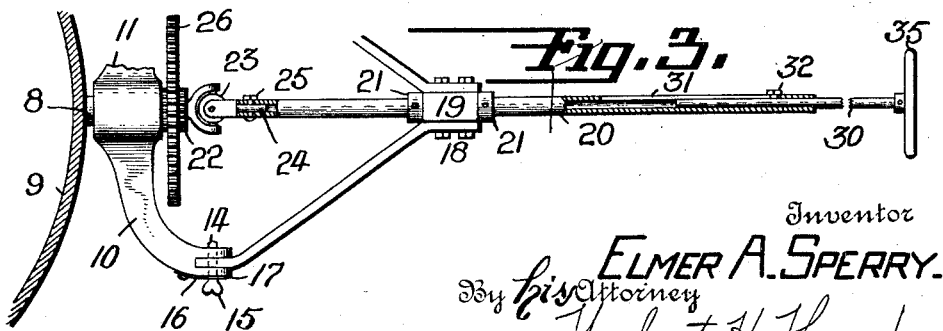
Inventor
ELMER A. SPERRY.
By his Attorney
Herbert H. Thompson Patented May 15, 1928.

UNITED STATES PATENT OFFICE.

ELMER A. SPERRY, OF BROOKLYN, NEW YORK.

SEARCHLIGHT FOR THE GUIDANCE OR DETECTION OF AIRCRAFT.

Original application filed April 19, 1918, Serial No. 229,485. Divided and this application filed June 1, 1923. Serial No. 642,745.

This invention relates to searchlights, and more specifically to means for directing the beam of a searchlight from a distant point.

The searchlight constitutes one of the essential elements in the system of defense against enemy aircraft. In view of the high speed of flight of the latter and the ease and rapidity with which these aircraft can change course, it is important that the searchlight respond quickly to its control and preferably that the operator may act also as observer. To render this possible the light should be controllable from a distance by a control to which the light will readily respond.

The searchlight has also come into use as a nocturnal beacon for guiding airplanes in times of peace, and for illuminating aviation fields. In such lights also, it is highly desirable to be able to direct the beam more or less vertically and to vary the direction of the beam at will, since it is found that a moving beam is much more easily picked up by the aviator than a stationary beam. When the air plane approaches the field, the light may also be employed to illuminate the field by directing the beam horizontally.

One of the principal objects of the present invention is to provide a simple control means fulfilling the above requirements.

A further object is to provide a searchlight and control means therefor which may readily be placed in a trench or trenches to minimize the danger of damage either to the light or operator, due to shell fire.

Another important object is to provide an invertible searchlight capable of being kept on a target passing directly above the light. Further objects and advantages will appear as the invention is hereinafter developed.

This application is a division of my copending application for searchlights for the guidance or detection of aircraft, Serial No. 229,485, filed April 19, 1918, patented June 26, 1923, No. 1,459,902.

Referring to the drawings which illustrate what I now consider the preferred form of my invention:

Fig. 1 is a sectional elevation of a trench system showing a searchlight mounted therein.

Fig. 2 is a plan view thereof.

Fig. 3 is a fragmentary detail plan view, partly in section, of one form of control mechanism.

My invention comprises a searchlight movable about two axes, one of which is preferably vertical and another horizontal. One form of support is shown in Fig. 1 as comprising a carriage 1 rotatably mounted on a base 2 about a vertical pivot 3. Rollers 4 may be mounted on the lower part of said carriage 1 in a position to engage the base 2 for the purpose of steadying the lamp. The carriage 1 comprises a plurality of upstanding arms 5, 6 journaled at their upper ends to receive the substantially horizontal pivots 7, 8, of the searchlight 9. The base 2 should preferably be of such area as to prevent excessive sinking of the searchlight when mounted on soft ground. It will be seen that by moving the searchlight about either or both of its axes the beam of the light may be directed anywhere in space.

While the control mechanism may be located adjacent the light, I prefer to locate it to one side for various reasons, among which are the following: When the light is employed for military purposes it is desirable to place the operating station at a substantial distance from the lamp to reduce casualties. Furthermore, it is found that the accuracy in directing the beam is enhanced as the angle between the lines connecting the target and observer and the target and searchlight is increased. A preferred form of distant control is shown in Figs. 1, 2 and 3 and may be constructed substantially as follows:

Secured to the upright 6, either integrally as indicated in Fig. 3 or preferably detachably as indicated in Fig. 2, are a plurality of arms 10, 11. The last mentioned arms are preferably bifurcated at their outer extremities to form seats for the straps 12, 13 which are pivotally connected, for a purpose which will hereinafter appear, to said arms. Preferably the connection between the straps and arms should be made detachable as indicated in Fig. 3, each pivot pin 14 being provided with a reduced portion or peripheral groove 17 into which a spring 16 is adapted to enter to hold the pin in operative position. Obviously the pins 14 may be readily withdrawn by raising the spring 16 and exerting a pull on the head 15. Detachably connected, by means of bolts 18, to the outer ends of straps 12, 13, is a block 19 through which an operating member or rod 20 extends. By revolving the rod 20 about the vertical axis of the searchlight, the latter may be caused to assume any position in azimuth.

The rod 20, which is illustrated in the form of a sleeve, may also be employed for controlling the position of the searchlight in elevation. While this function may be accomplished by connecting the member 20 directly to one of the horizontal pivots 7 or 8 of the light, I prefer to effect this connection through reduction gearing. The member 20 is rotatable in the block 19, a collar 21 being mounted on said member on each side of block 19 to prevent end movement of said member. The inner end of the operating member is connected to the shaft of pinion 22, journaled in the upright 6 by means of a universal joint 23. This universal joint, which is directly in line with the line of pivots 14, is preferably detachably connected to the sleeve 20 by means of a shank 24 adapted to enter said sleeve and to be secured thereto by means of a through bolt 25. The pinion 22 meshes with a gear 26 secured to pivot 8 of the searchlight so that by rotating the operating member 20 the light may be rotated about its horizontal pivots and the elevation of the beam controlled.

My invention as above described is especially adapted to be applied to military use, particularly in anti-aircraft work. Thus the light may be mounted in a trench T surrounded by a substantially circular trench or runway T' spaced a substantial distance from the central trench. Preferably the operating member should be made adjustable in length. This may be accomplished by providing a rod 30 adapted to telescope into the sleeve 20 but connected thereto in such a manner as to turn therewith. One form of suitable connection is shown in Fig. 3 as comprising a longitudinal slot 31 in sleeve 20 adapted to receive a set screw 32 screwed into rod 30. Obviously the rod 30 may be pushed into or pulled out of the sleeve 20 but on rotation of the first mentioned member the sleeve 20 will rotate therewith. To facilitate the control of the searchlight the rod 30 may have rotatably mounted thereon a wheel 34, which may assume the form of an ordinary bicycle wheel, adapted to travel on the track or runway 33 to support the weight of the operating member. A manually operable member in the form of a hand-wheel 35 is rigidly but preferably detachably secured to the free end of rod 30.

It will be seen that the searchlight 9 and all of its control is wholly below the surface of the ground so that the chance of damage thereto by gunfire is minimized. If desirable a barrier of sand bags 36 may be provided around the trench T' for additional protection. To control the direction of the beam in azimuth the operator in the trench T' simply moves around this trench in one direction or the other, moving the member 35 with him. To control the elevation of the beam the operator rotates the wheel 35 in one direction or the other.

As the operator is stationed a substantial distance to one side of the searchlight in the direction in which the horizontal axis thereof extends it will be seen that not only is he protected against injury by shell-fire drawn by the light, but the angle between his line of sight and that of the beam is large, resulting in great accuracy in directing the beam.

It has heretofore been the practice to mount a searchlight for rotation about a horizontal axis, but so far as I am aware the electrode or carbon holders and the control box were mounted at the bottom of the drum at a position substantially midway between the pivots. This arrangement restricts the angle through which the light may be swung about the horizontal axis, for if the light is moved to a position where the holder and control box are above the arc, damage to said elements results, due to the intense heat arising from the arc. In order to render it possible to move the searchlight to any position about the horizontal axis, I connect the control box 40 and the electrode holders, one of which is shown at 41, to the drum 42 of the searchlight 9, in a position closer to one of the pivots 7 than to the other. Obviously with this arrangement the said elements 40, 41 will never be in the path of the heat rising from the arc regardless of what position the light assumes. 47 indicates a ventilating housing which may enclose a ventilating fan.

It will be seen that I have provided a searchlight which may be readily inverted in action and is therefore, easily kept on the target. Furthermore the distant control is simple, reliable and may be readily assembled or disassembled by virtue of the detachable connections.

In order to conduct electric current to the light, a current conducting cable 48 may be led underground from a distant generating plant (not shown) to the light. Considerable slack should be provided in said cable between the point where it emerges from the ground and the light in order that the latter may be rotated several times in azimuth in the same direction without strain on said cable. If desirable a strain detachable connector 49 may be provided in said slack portion to prevent breakage of said cable. Communicating passages P may be provided between the trenches T and T' so that the operator may gain access to the light without exposing himself to enemy fire. Planks or board 50 may be placed over said passageways to preserve the continuity of the trackway of the wheel 34. Any unevenness in this trackway will not interfere with the operation of the mechanism because by virtue of the pivots 14 and universal connection 23 the wheel 34 will readily follow the profile of the trackway.

It will be obvious that my invention is equally well adapted for peace time uses in connection with aviation fields and the like.

In accordance with the provision of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In combination, a searchlight, a support therefor pivoted for rotation about a substantially vertical axis, a laterally extending operating member, a plurality of arms secured to said support and extending therefrom, a strap connected at one end to each of said arms and means connected to the other end of said straps for supporting said operating member.

2. In combination, a searchlight, a support therefor pivoted for rotation about a substantially vertical axis, a laterally extending operating member, means including a universal joint whereby rotation of said member about its own axis rotates said searchlight about a given axis and the revolution of said member rotates said searchlight about an axis at right angles to said first axis, a plurality of arms secured to said support and extending therefrom, straps each pivotally connected at one end to each of said arms, and means connected to the other end of said straps for supporting said operating member.

In testimony whereof I have affixed my signature.

ELMER A. SPERRY.